M. WALKER.
APPARATUS FOR CONTROLLING COMMUTATING FIELD STRENGTH OF DOUBLE COMMUTATOR MACHINES.
APPLICATION FILED SEPT. 30, 1916.

1,284,831.

Patented Nov. 12, 1918.

WITNESSES
Fred. A. Lind.
O. U. Kennedy

INVENTOR
Miles Walker
BY
Wesley G. Carr
ATTORNEY

UNITED STATES PATENT OFFICE.

MILES WALKER, OF MANCHESTER, ENGLAND, ASSIGNOR TO WESTINGHOUSE ELECTRIC & MANUFACTURING COMPANY, A CORPORATION OF PENNSYLVANIA.

APPARATUS FOR CONTROLLING COMMUTATING-FIELD STRENGTH OF DOUBLE-COMMUTATOR MACHINES.

1,284,831.

Specification of Letters Patent. Patented Nov. 12, 1918.

Application filed September 30, 1916. Serial No. 123,025.

*To all whom it may concern:*

Be it known that I, MILES WALKER, a subject of the King of England, and a resident of Manchester, in the county of Lancaster, England, have invented a new and useful Improvement in Apparatus for Controlling Commutating-Field Strength of Double-Commutator Machines, of which the following is a specification.

My invention relates to dynamo-electric machines of the commutator type having commutating poles or compensating windings, such as direct-current generators, motors, and the like, and particularly to dynamo-electric machines of the above character having more than one commutator cylinder.

In cases where the commutating machine must be built for an output of several thousand amperes, and there are only a few poles on the machine, the current per brush arm becomes greater than can conveniently be collected on one commutator cylinder. It is the practice in such cases to provide two commutator cylinders, one at each end, or both at the same end, of the armature. Where this is done, difficulties sometimes arise in adjusting the load equally between the two commutators.

According to my invention, each commutator cylinder is provided with a suitable brush gear, the two brush gears being rigidly connected or related in such manner that both brush gears may be rocked together. The brushes on one commutator cylinder, hereinafter called the "forward" brushes, are placed in advance of the brushes on the other commutator, hereinafter called the "rear" brushes.

In carrying out my invention, according to one arrangement, the forward brushes are connected, through the commutating pole winding, to the load, as described in my Patent No. 1,158,598, Nov. 2, 1915, and the rear brushes are connected either through a resistance directly to the load or differentially through the commutating pole winding.

Figure 1:
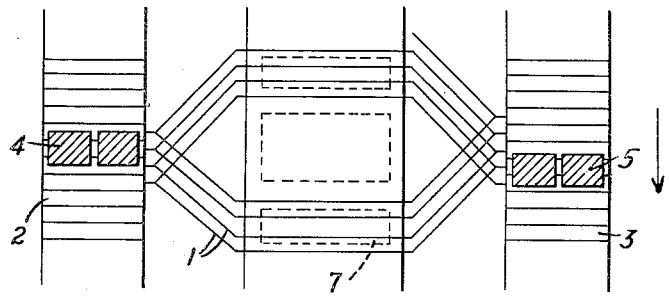
Figure 2:
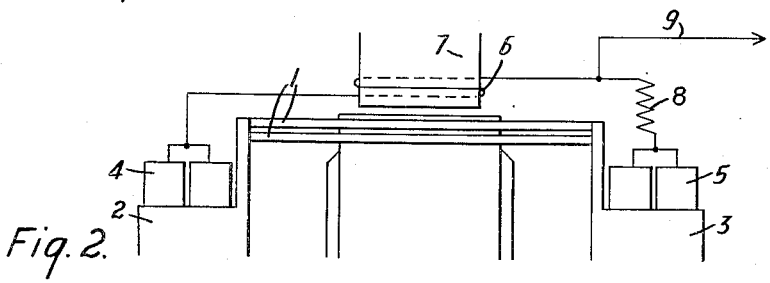
Figure 3:
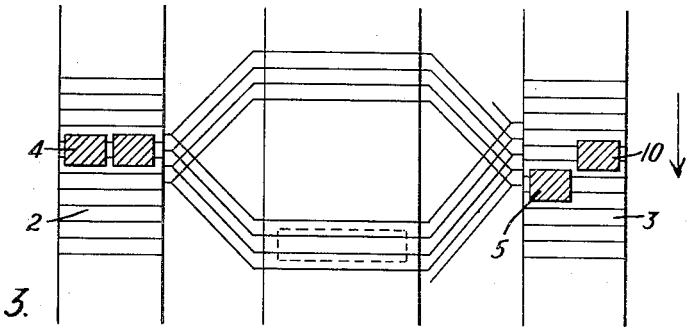

In the accompanying drawings, Figure 1 is a diagrammatic view, in plan, of a portion of a dynamo-electric machine embodying my invention; Fig. 2 is a view, partially in section and partially in side elevation, of the machine shown in Fig. 1; and Fig. 3 is a view, similar to Fig. 1, showing a modification in the arrangement of the brushes.

Figs. 1 and 2 show the armature conductors 1, arranged to form an ordinary lap winding and connected, at their respective ends, to commutator cylinders 2 and 3. Brushes 4 and 5 coöperate with the commutator cylinders 2 and 3, respectively, the current collected by the forward brushes 4 passing through the winding 6 of a commutating pole 7 and then to the load through a main 9, as best shown in Fig. 2. The current collected by the rear brushes 5 passes through a resistor 8 and then to the main 9; or it may pass through a portion of the winding 6, as shown in Fig. 2 of my patent aforementioned.

The action of the machine, in general, is the same as that described in the above mentioned patent and is as follows: If the commutating pole should be, for any reason, too weak, the self-induction of the armature coils raises the potential of the bars under the brushes 4 to a higher average value than the potential of the bars under brushes 5. This increases the current collected by the brushes 4 and strengthens the commutating pole 7. If, on the contrary, the commutating pole is too strong, the average potential of the bars under the brushes 5 is higher than the average potential of the bars under the brushes 4; this increases the current collected by the brushes 5 and weakens the commutating pole. Thus, the commutating arrangements are self-adjusting.

If the number of turns in the commutating pole winding is adjusted so that, when one-half of the full-load current passes through the coil, the pole is excited to the proper strength, the action above described will cause the current to be divided equally between the two commutator cylinders. This division of the current between the two commutator cylinders will be approximately correct over a wide range of load, but, in case the iron of the commutating pole becomes saturated, a higher load will be thrown upon commutator cylinder 2.

Instead of passing the current from the forward brushes through the commutating winding, it may be caused to actuate an auxiliary relay device which controls the voltage of a source of electrical energy from which the commutating winding is energized, so as to bring about the required changes in the strength of the field produced by the commutating pole and, at the same time, equalize the load between the two commutators. Auxiliary relay devices of this kind are described in my copending application Serial No. 123024, filed Sept. 30, 1916.

Instead of arranging the brushes on the commutator cylinders as shown in Fig. 1, they may be arranged alternately, if desired. For instance, I may have brushes on the commutator cylinder 2 that occupy positions corresponding to those of the brushes 5; also, the commutator cylinder 3 may be provided with brushes to occupy a forward position corresponding to that of the brushes 4. Fig. 3 shows a brush 10 located in a forward position on commutator cylinder 3, said brush being connected either through the commutating-pole winding 6 in the same manner as the brushes 4 or through a resistor similar to resistor 8. Brushes located in such a position are of use in preserving the continuity of the circuit as the bars leave the end of brush 5.

I claim as my invention:

1. The combination with a dynamo-electric machine provided with a pair of commutator cylinders, and a commutating field winding, of brushes of like polarity connected together and coöperating with both of said commutator cylinders, the brush on one of said commutator cylinders being arranged circumferentially in advance of the brush on the other of said commutator cylinders, and the current collected by said forward brush passing through the said commutating field winding.

2. In a dynamo-electric machine provided with a pair of commutator cylinders wherein the commutating axis shifts with changes of load, the combination with a commutating field winding, of brushes of like polarity coöperating with both of said commutator cylinders, the brush on one of said commutator cylinders being arranged circumferentially in advance of the brush on the other of said commutator cylinders and connections whereby the said brush supplies current to the said commutating winding when the commutating axis shifts under heavy load.

3. In a dynamo-electric machine provided with a pair of commutator cylinders wherein the commutating axis shifts with changes of load, the combination with a commutating field winding, of brushes of like polarity coöperating with different commutator cylinders and circumferentially separated with respect to the commutating axis, and connections whereby the brush in the direction of heavy load shift of the commutating axis supplies current to the commutating field.

In testimony whereof, I have hereunto subscribed my name this thirteenth day of September, 1916.

MILES WALKER.

Witnesses:
JAS. STEWART BROADFOOT,
MARGARET S. MAYOH.